Aug. 1, 1961     M. W. LA RUE, JR., ET AL     2,994,256
EXPOSURE CONTROL FOR PHOTOGRAPHIC CAMERAS
Original Filed Dec. 17, 1956     6 Sheets-Sheet 1
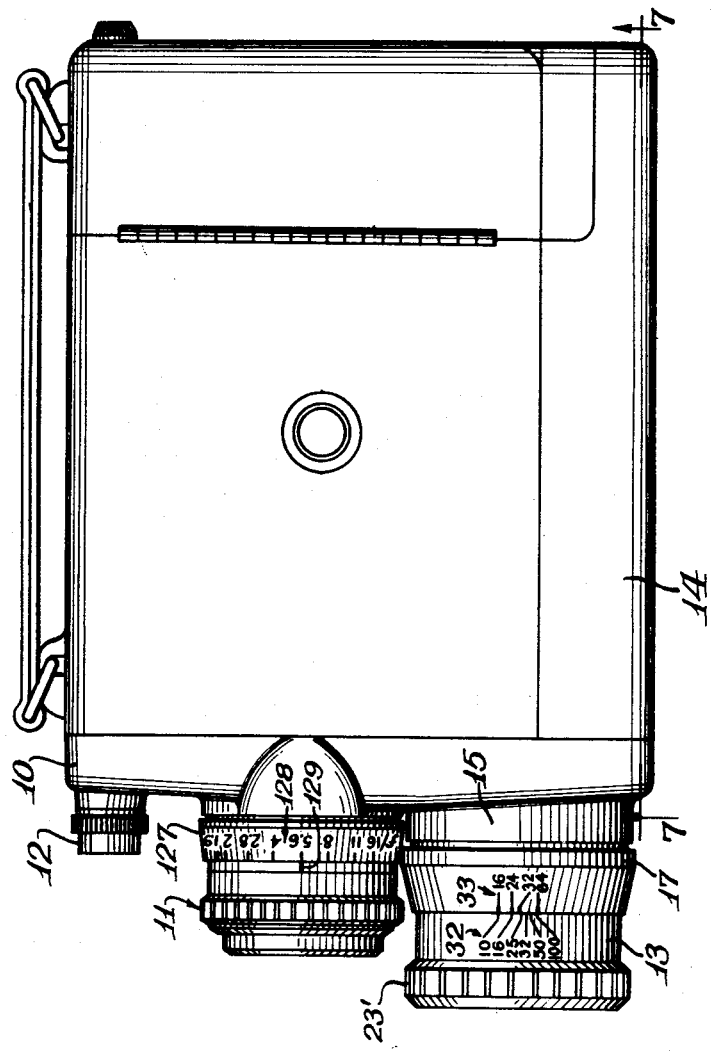
Inventors:
Mervin W. LaRue, Jr.
William W. Wightman
By Robert F. Miehle, Atty.

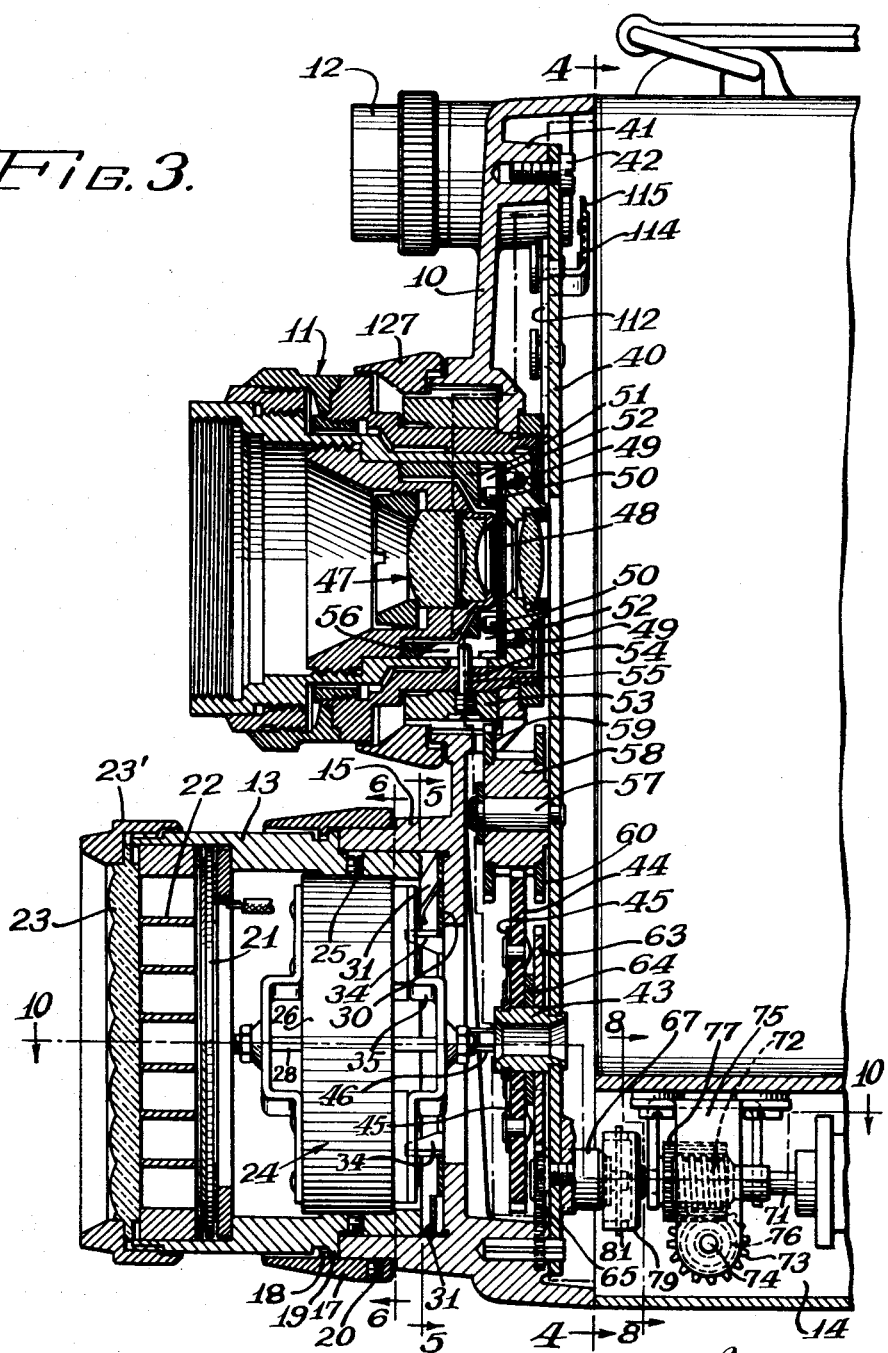

Inventors:
Mervin W. LaRue, Jr.
William W. Wightman
By Robert F. Miehle, Atty.

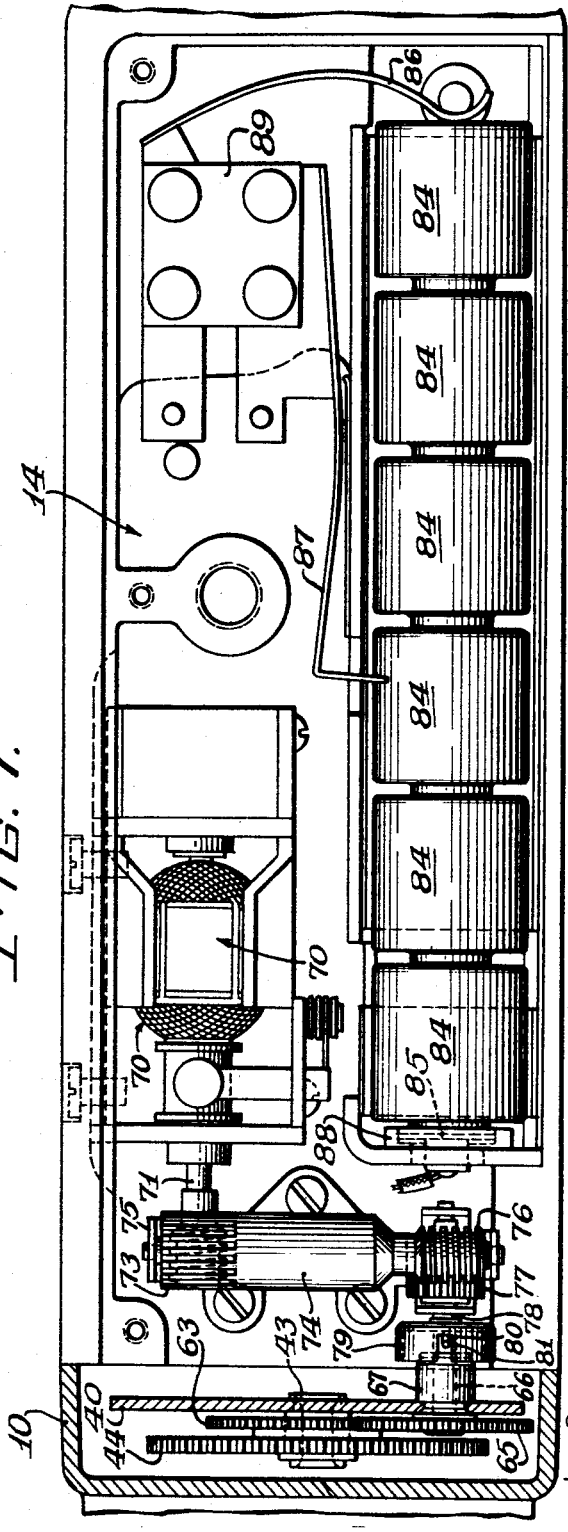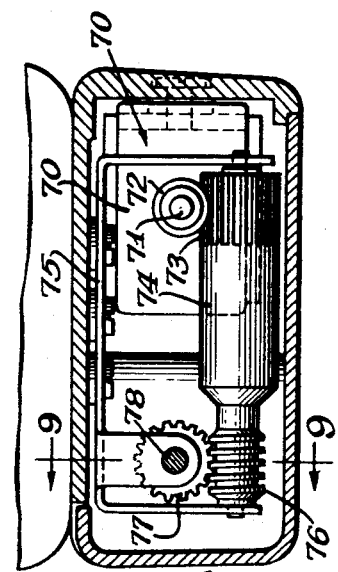

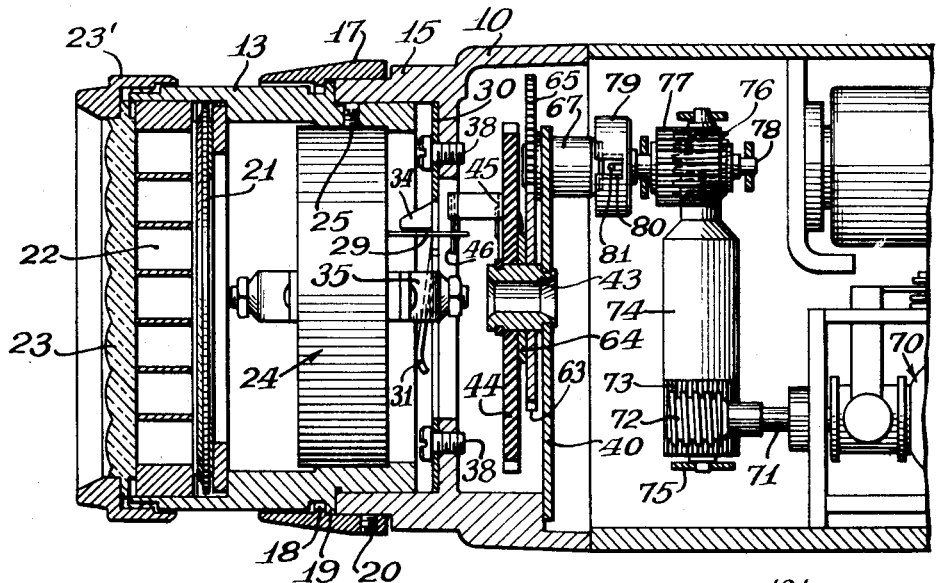
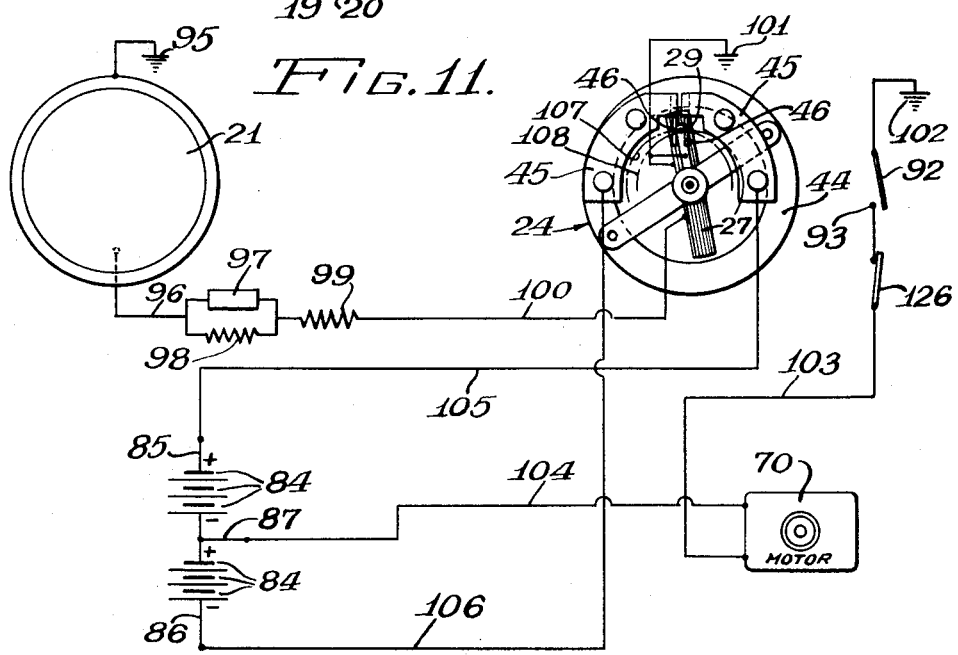

United States Patent Office 2,994,256
Patented Aug. 1, 1961

2,994,256
EXPOSURE CONTROL FOR PHOTOGRAPHIC CAMERAS
Mervin W. La Rue, Jr., Park Ridge, and William W. Wightman, Niles, Ill., assignors to Bell & Howell Company, Chicago, Ill., a corporation of Illinois
Original application Dec. 17, 1956, Ser. No. 628,753. Divided and this application June 18, 1958, Ser. No. 744,037
12 Claims. (Cl. 95—10)

This invention relates to apparatus for setting the iris of a photographic camera to insure proper exposure of the film therein under the conditions of the light picked up by the apparatus, and has for its general object the provision of a new and improved apparatus of this kind, this application being a division of our copending application, Serial Number 628,753, filed December 17, 1956, for exposure control for photographic cameras.

The specific object of the invention is to provide in a camera exposure control embodying a photoelectric cell and a galvanometer in circuit therewith, temperature compensating means whereby the exposure control functions uniformly over a wide range of temperatures.

Further objects of the invention not specifically mentioned here will be apparent from the detailed description and claims which follow, reference being had to the accompanying drawings in which a preferred embodiment of the invention is shown by way of example only and in which:

FIG. 1 is a front elevational view of a portable motion picture camera equipped with the devices of the present invention;

FIG. 2 is a side elevational view of the camera shown in FIG. 1;

FIG. 3 is a fragmentary cross sectional view taken along the line 3—3 of FIG. 1, looking in the direction of the arrows;

FIG. 7 is a plan view of the motor compartment of the camera as seen along the line 7—7 of FIG. 2, looking in the direction of the arrows and having the motor compartment cover removed;

FIG. 8 is a fragmentary cross sectional view along the line 8—8 of FIG. 3, looking in the direction of the arrows;

FIG. 9 is a cross sectional view along the line 9—9 of FIG. 8, looking in the direction of the arrows and drawn to an enlarged scale;

FIG. 10 is a bottom view, partly in section, along the line 10—10 of FIG. 3;

FIG. 11 is a schematic circuit diagram of the invention; and

Figure 4:
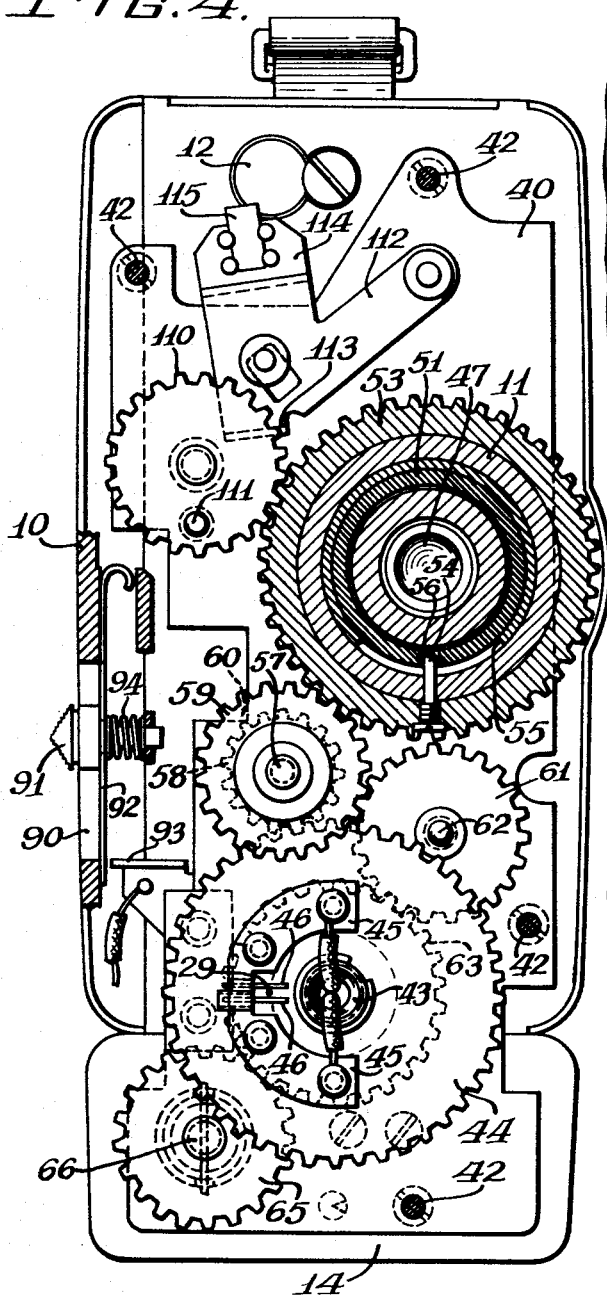
FIG. 4 is an elevational view of the rear of the front plate of the camera as seen from the line 4—4 of FIG. 3, looking in the direction of the arrows with certain parts shown in section.

In order to properly expose the photographic film with which a camera is loaded, it is preferable that a light meter be used to measure the conditions of light under which the picture is to be taken, thereby to determine the proper setting of the iris of the camera so as to admit the proper amount of light to the film at the shutter speed at which the camera is set. The present invention obviates the necessity of using a separate light meter by incorporating in the camera itself a photoelectric cell by which the light value is determined, together with apparatus for automatically setting the iris of the camera in accordance with this light value and the shutter speed at which the camera is set. In the embodiment of the invention shown by way of example, the setting of the iris is fully automatic, being accomplished by an electric motor that is connected by a gear train to the iris ring of the camera. An electric switch is conveniently actuated by the button through which the camera is controlled thereby to effect setting of the iris under the existing light conditions just previous to exposure of the film.

The invention will be best understood by reference to the accompanying drawings in which there is shown a portable motion picture camera of the magazine loading type to which the devices of the invention are applied.

The camera comprises the usual front plate 10 in which the photographic lens barrel 11 and front portion of the finder 12 are mounted in the usual manner. As shown, the lens barrel incorporates a focusing type of lens mounting, this particular mounting being shown by way of example as the invention may equally well be used with a fixed focus lens if desired.

Also mounted upon the front plate 10 of the camera in downwardly spaced parallelism with the photographic lens, is a tubular member 13, and located at the bottom of the camera is a motor compartment 14 in which the driving motor and batteries therefor are mounted, as will presently appear. The remainder of the camera, that is the main body thereof and instrumentalities therein contained, are standard and need not here be described in detail.

As will best be seen in FIGS. 3 and 10, the tubular member 13 is mounted for angular adjustment in a forwardly extending boss 15 on the lower portion of the front plate 10 of the camera, and the tubular member is so mounted by a mounting ring 17 provided with an intermediately disposed internal flange 18 rearwardly engaged on an external flange 19 on the tubular member 13 and bearing rearwardly against the front of the boss 15, and the mounting ring having its rear portion engaged on the exterior of the boss 15 and secured thereon by set screws 20.

Mounted in the forward portion of the tubular member 13 is a photoelectric cell 21, together with a light controlling baffle 22 and reticular lens 23, all of which are held in by a mounting ring 23' which secures these devices in the barrel. The photoelectric cell is accessible to light from forwardly of the camera, and preferably the baffle 22 and the lens 23 of the photoelectric cell unit are designed to accept light from a field equal to or closely approximating the field of the photographic lens that is mounted in the lens barrel 11. Through this arrangement the light value by which the setting of the iris is controlled is substantially the same as the light that will be admitted to the camera to expose the film when the shutter is open.

Figure 6:
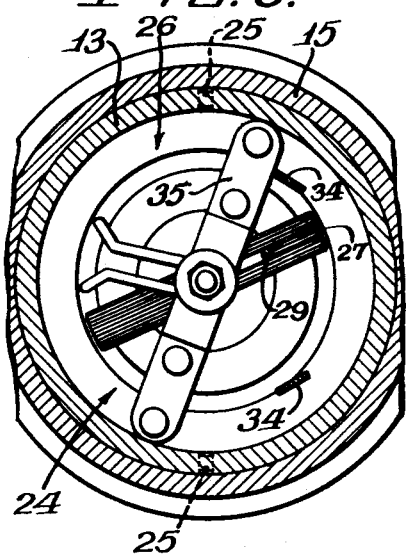
FIG. 6 is a fragmentary cross sectional view taken substantially along the line 6—6 of FIG. 3, looking in the direction of the arrows.

Mounted in the tubular member 13 in concentric relation therewith and in the rear portion thereof rearwardly of the photoelectric cell, is a galvanometer 24 which is secured in the tubular member by set screws 25. (FIGS. 3, 6 and 10). The galvanometer, which is of a usual type, comprises a permanent magnet stator 26 and a coil 27 arranged in the center thereof and rotatable coaxially thereof and consequently coaxially of the tubular member 13 by means of a rotatably mounted shaft 28 upon which the coil is mounted. The coil is biased as usual into a zero position by usual spring means not shown, and fixed with and thus rotatable with the coil, is a rearwardly projecting contact 29.

An annular stop member 30 is mounted on the front plate 10 of the camera within the bore of the boss 15 and rearwardly of the galvanometer 24 (FIGS. 3 and 5), and forwardly projecting spring fingers 31 on the stop member bear forwardly against the inner end of the tubular member 13 to maintain the tubular member flange 19 in frictional engagement with the mounting ring flange 18 and thus maintain the tubular member in position angularly on the boss 15 while permitting angular adjustment of the tubular member for a purpose hereinafter appearing.

Projecting forwardly from the stop member 30 are spaced apart lugs 34 which lie in the path of the rear bearing bracket 35 by which the rear end of the shaft 28 of the galvanometer is supported. Engagement of this rear mounting bracket 35 with the stops limits the rotation of the tubular member 13 and apparatus carried thereby around the axis of the barrel.

Figure 5:
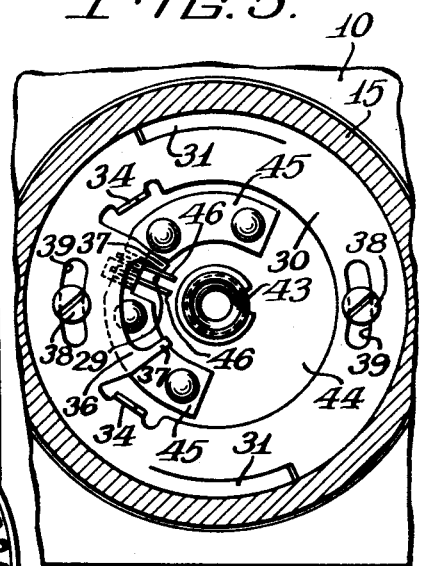
FIG. 5 is a fragmentary cross sectional view taken along the line 5—5 of FIG. 3, looking in the direction of the arrows.

As will be seen best in FIG. 5, stop member 30 carries an inwardly extending portion 36 that terminates in spaced apart stops 37 which lie in the path of the movable contact 29 that is carried with the coil 27 of the galvanometer, these stops serving to limit the movement of the coil 27 around the axis of the shaft 28 upon which the coil is mounted.

Stop member 30 is mounted within the boss 15 by screws 38 screwthreaded into the front plate 10 and projecting through angularly extending slots 39 in the stop member 30, thereby to permit limited adjustment of the stop member to position stops 34 and 37 in a desired position angularly of the axis of the tubular member 13. This adjustment is set during initial assembly and calibration of the apparatus, and usually will remain in this set position throughout the life of the apparatus.

As will be seen best in FIG. 2, the tubular member 13 carries an indexing scale 32 and the mounting ring 17 carries a cooperating indexing scale 33. The markings of the scale 32 on the tubular member may be designated and positioned to correspond to the emulsion speed ratings of various films according to the A.S.A. system, and the markings of the scale 33 on the mounting ring may be designated and positioned according to the shutter speeds of the camera, which in the case of the motion picture camera shown may vary from sixteen frames per second to sixty-four frames per second. By rotating the tubular member 13 and instrumentalities carried thereby around the axis of the barrel, the mark of the scale 32 corresponding to the emulsion speed of the film with which the camera is loaded, is registered with the mark of the scale 33 corresponding to the shutter speed for which the camera is set, thereby to adjust the apparatus to properly set the iris of the camera for that particular film at that shutter speed as hereinafter described.

Fixed upon the inner face of the front plate 10 of the camera (FIGS. 3 and 4), is a mounting base or plate 40 that is positioned inwardly of the camera by bosses 41 to which the base is secured in convenient manner as by screws 42.

Fixed in the mounting base 40 and extending therethrough, near the bottom thereof, is an axially bored arbor 43 upon which is journaled a gear 44. The gear 44 is of insulating material and fixed on its front face in angularly spaced relation are conductive plates 45 upon which two forwardly disposed contacts 46 are respectively mounted in spaced relation angularly of the gear, these plates and contacts being insulated from each other and from the remainder of the structure by reason of the insulating character of the gear 44. The movable contact 29 carried by the coil 27 of the galvanometer extends rearwardly from the galvanometer coil and between the spaced apart contacts 46, as will be seen best in FIGS. 4 and 10, for alternate contact therewith with angular movement of the galvanometer coil in opposite directions, the contact 29 and contacts 46 constituting a double throw switch.

As shown, the photographic lens barrel 11 carries within it a suitable photographic lens 47 and a conventional iris which comprises (FIG. 3) a plurality of iris leaves 48 arranged in overlapping relation about the lens axis and individually pivotally mounted for opening and closing movement by means of pivot pins 49 pivotally mounted on the lens barrel in angularly spaced relation about the lens axis, control pins 50 secured on the leaves in uniformly radially spaced relation with the pivot pins and arranged about the lens axis, a control ring 51 rotatably mounted within the lens barrel in coaxial relation with the lens axis and provided with cam slots 52 uniformly angularly spaced thereon and respectively slidably engaged by the control pins, an iris adjusting ring 53 rotatably mounted externally on the lens barrel 11, and a connecting pin 54 secured on the adjusting ring and extending radially inward thereof through an angular slot 55 through the lens barrel and engaging in a slot 56 in the control ring 51, so that angular movement of the iris adjusting ring effects opening or closing movement of the iris depending on the direction of movement of the iris adjusting ring. For the purpose of the invention hereof, the iris adjusting ring 53 is in the form of a gear.

Journaled upon an arbor 57 carried by the mounting base 40 is a cluster consisting of a center gear 58, at one end of which is fixed a larger diameter gear 59 that is meshed with the iris adjusting ring gear 53. Included in the cluster with gear 58 is another gear 60 which in FIG. 4 is shown meshed with a gear 61 that is journaled upon a pin 62 that is carried by the mounting base. Gear 61 meshes with a gear 63 that is journaled upon the arbor 43 and separated from the gear 44 thereon by a washer 64. Gear 63 is meshed with a gear 65 that is fixed upon a shaft 66 (FIG. 9) that is journaled in a bushing 67 fixed in the mounting base 40. Through this arrangement, rotation of the shaft 66 rotates gears 65, 63, 61, 60, 58, 59 and 53, to move the iris from one position to another. Gear 58 meshes with and rotates the gear 44 and spaced apart contacts 46 carried thereby in correspondence with rotation of the iris ring adjusting gear 53 for a purpose which will presently appear.

In order to rotate the shaft 66, an electric motor 70, which, as shown, is of the permanent field magnet type, is provided in the motor compartment 14 where it is mounted in suitable brackets and secured in the compartment preferably by screws, as shown in FIGS. 7 and 8. The shaft 71 of the motor carries a worm 72 that meshes with a gear 73 on a cross shaft 74 that is rotatably mounted in the bracket 75 fixed in the motor compartment. A worm 76 on the cross shaft 74 meshes with a gear 77 rotatably mounted on a shaft 78 which is rotatably mounted on the bracket 75 and is alined with the shaft 66 (FIG. 9). Shaft 78 carries a cup shaped coupling member 79 provided with diametrically opposite slots 80, and a pin 81 is secured on the shaft 66 in diametrically extending relation therewith and slidably engages in the slots 80 to form a drive coupling between the shafts 78 and 66.

Disposed within an enlargement of the bore of the gear 77 are friction disks 82 of yieldable material, which together with the web of this gear and a rigid end washer 82' are compressed together between C spring washers 83 which are engaged respectively in axially spaced grooves on the shaft 78, thus forming a yieldable friction drive between the gear 77 and the shaft 78. The drive between the motor shaft 71 and the shaft 66 constitutes a yieldable reduction drive which permits of a relatively small low power motor and which permits of rotation of the shaft 66 relative to the motor.

Also mounted in the motor compartment are a plurality of battery cells 84 connected together in series and to an electrical contact 85 at one end of the series and to a contact spring 86 at the other end thereof (FIG. 7). A contact spring 87 makes contact with the series of battery cells at the mid-point thereof, the contact 85 and the contact springs 86 and 87 being fixed in the compartment and insulated from the camera structure and from each other by suitable insulators respectively designated at 88 and 89.

Projecting through a slot in the side wall of the front plate 10 of the camera (FIG. 4) is a camera control button 91 that is slidable in this slot to initiate and terminate operation of the camera to expose the film therein. Located inwardly of this button is a contact spring 92 which is mounted on the button 91 and is in electrical contact with the frame of the camera and normally spaced away from a fixed contact 93 that is insulated from the frame. A spring 94 encircles the stem of the button 91 and bears against the finger spring 92 to maintain it out of engagement with the fixed contact 93. By pressing on the button 91 to move it inwardly of the camera, finger spring 92 is moved into engagement with the fixed contact 93.

The inward movement of the camera control button 91 to engage the contact spring 92 with the contact 93 is a natural incident of manual engagement of the control button to effect operation of the camera, so that normally these contacts are engaged during operation of the camera and are disengaged when the control button is released and operation of the camera is thus terminated. Engagement of the contact spring 92 with the contact 93 causes the exposure control to function, and it is accordingly desirable to engage these contacts before moving the control button 91 into camera operating position so that the exposure control has time to adjust the iris to the instant light condition before any film is exposed.

As will be seen in the schematic circuit (FIG. 11), one terminal of the photoelectric cell is connected to the frame of the camera at 95, which connection is for convenience referred to as "ground," and at its other terminal is connected by conductor 96 that leads to a thermistor 97 that is shunted by a modifying resistor 98, the circuit continuing through a trimming resistance 99 over conductor 100 through the winding coil 27 of the galvanometer to ground at 101.

The current generated by the light falling on the photoelectric cell 21 thus passes through the galvanometer coil 27 and tends to move it and the movable contact 29 around the axis of the coil from the aforementioned spring biased zero position thereof to a position, dependent on the instant intensity of the light impinging on this cell and resulting corresponding potential on the coil, in which the resultant magnetic attraction between the coil and galvanometer stator balances the spring bias on the coil.

Still referring to FIGURE 11, a power circuit for the motor 70 comprises the contact spring 92 connected to ground 102, the contact 93 connected to one end of the motor winding by a conductor 103, a conductor 104 connecting the other end of the motor winding to the spring contact 87 which contacts the battery cells 84 at the mid-point thereof, a conductor 105 connecting one of the contact plates 45 and with it the corresponding contact 56 with the contact 85 which contacts one end of the battery cells 84, a conductor 106 connecting the other of the contact plates 45 and with it the corresponding contact 46 with the contact 86 which contacts the oher end of the battery cells 84, and the connection of the movable contact 29 to ground 101. The conductors 105 and 106 conveniently pass from in front of the gear 44 where they are respectively secured to the fixed contacts 46, through the bore of the arbor 43 and into the motor compartment 14, as shown in FIGURE 4.

Noting that the movable contact 29 is arranged between the spaced contacts 46, and forms double throw switch therewith, the movable contact may engage either spaced contact or may assume an intermediate position therebetween in which it is disengaged from both spaced contacts, and assuming the spring contact 92 to be engaged with the contact 93, engagement of the movable contact with the righthand spaced contact 46, as seen in FIG. 11, closes a circuit through the motor 70 from the group of battery cell 84 connected between the battery contacts 85 and 87 and engagement of the movable contact with the lefthand spaced contact 46 closes a circuit through the motor from the group of battery cells connected between the battery contacts 86 and 87. The battery cells being arranged in series and the intermediate battery contact 87 being common and the battery contacts 85 and 86 being individual to these circuits, potential of opposite polarities is supplied to the motor respectively through these circuits, so that the motor armature and its shaft 71 rotates in one direction or the other depending on which spaced contact 46 the movable contact 29 engages.

Recalling that the motor 70 is connected to adjust in correspondence the iris adjusting ring gear 53 and with it the iris and the gear 44 and the spaced contacts 46 carried thereby, the operation of the exposure control will now be described.

Having positioned the camera to photograph the desired scene, light falling upon the photoelectric cell 21 causes the movable contact 29 to be urged to a position corresponding with the intensity of the instant light as hereinbefore described, and as a result, except where the iris happens to be already adjustable in correspondence with the instant light, the movable contact 29 is engaged with one or the other of the fixed contacts 46 depending on whether the opening of the iris is to be increased or decreased to correspond with the instant light. This closes the corresponding motor circuit and as a result the motor is energized with potential of the proper polarity and adjusts the iris and gear 44 and the fixed contacts 46 carried thereby to correspond with the instant light, the movable contact 29 following and maintaining engagement with the corresponding spaced contact 46 until the movable contact 29 reaches the position into which it is urged by the instant potential of the photoelectric cell, whereupon the engaged spaced contact disengages from the movable contact, thus deenergizing the motor and terminating adjustment of the iris and gear 44 with the iris adjusted in correspondence with the instant light. This action is repeated each time the light falling on the photoelectric cell changes.

Recalling that the galvanometer 25 is mounted within the tubular member 13 which is rotatably mounted in the boss 15 of the front plate 10 (FIGS. 3 and 10), the galvanometer is angularly adjustable about its axis, relative to the gear 44 carrying the contacts 46 and to the plate 30, by angular adjustment of the tubular member 13, this angular adjustment being limited by the lugs 34 of the plate 30 engaging the rear bearing bracket 35 of the galvanometer as best shown in FIG. 6. Such adjustment of the galvanometer results in corresponding adjustment of the zero position of the contact 29, so that the automatic positioning of the iris for a given amount of light impinging on the photoelectric cell is correspondingly adjusted. It is this adjustment which is utilized to adjust the mechanism in correspondence with the emulsion speed of the film being used and with the instant shutter speed, the scales 32 and 33 cooperating for predeterminately adjusting the mechanism for these factors, as hereinbefore described.

Photoelectric cells when activated by light passing through the lens and baffles protecting them, produce very small currents, and as a result the force tending to rotate the coil 27 of the galvanometer is small and the contact pressure between the movable contact 29 and the spaced contact 46 into engagement with which it is thus driven is likewise small. The current drawn by the motor is relatively large when compared with the current driving the movable coil 27 of the galvanometer, and since this motor current passes through the movable and spaced contacts 29 and 46 which are maintained together by light pressure, there is a tendency for these contacts to be welded together by the heat generated by this current. To guard against this welding of the contacts, we have offset the axis around which gear 44 rotates with respect to the axis of the tubular member 13 on which the coil 27 rotates. As a result of this construction, the movable contact 29 and spaced contacts 46 rotate in deviating paths respectively designated at 107 and 108, with the result that there is a rubbing action between the movable contact 29 and the spaced contact 46 engaged thereby as the mechanism is operated. It has been found that this wiping action of the contacts prevents welding together thereof, notwithstanding that the current carried through the contacts is relatively high and the engaging pressure therebetween is relatively low.

In order to advise the operator of the camera that the light conditions encountered are approaching the minimum required for proper exposure of the film with which the camera is loaded, at the speed at which the shutter is set, we have provided a gear 110 (FIG. 4) that is meshed with the iris adjustment ring gear 53 and carries a crank pin 111. Pivoted upon the mounting base 40 is a lever 112 which is yieldably urged downwardly by gravity and is provided with an edge 113 of which lies in the path of pin 111 as the gear 110 is rotated. Lever 112 contains an offset extension 114 (FIG. 3) which carries an indicator 115 movable with the lever into and out of indicating position visible through the view finder.

The arrangement is such that with final movement of the iris adjusting ring gear 53 and iris into the maximum exposure postion of the iris, the gear 53 moving clockwise and the gear 110 moving counter clockwise in FIG. 4, the crank pin 111 engages upwardly against the edge 113 and moves the lever 112 to position the indicator 115 in its indicating position visible through the view finder, and with initial movement of the gear 53 and iris out of the maximum exposure position of the iris, the gear 53 moving counter clockwise and the gear 110 moving clockwise, the crank pin moves downwardly and permits the lever 112 and the indicator 115 to move downwardly to position the indicator out of its said indicating position.

Figure 12:
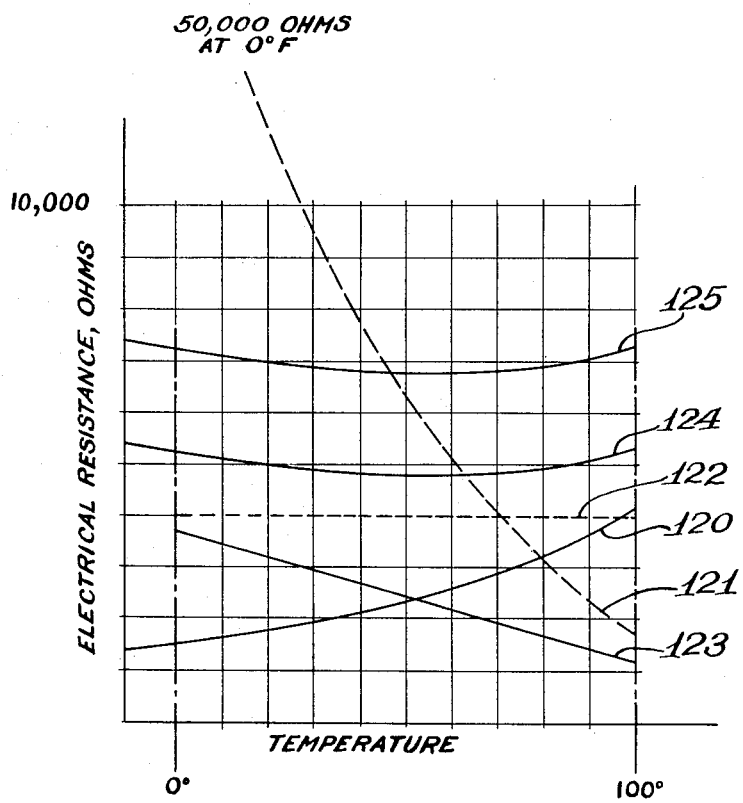
FIG. 12 is a graph showing the temperature resistance characteristics of the galvanometer circuit.

In the installation shown in the drawings by way of example, the photoelectric cell 21 is a commercial cell one and one-half inches (1½″) in diameter and the galvanometer 25 is a commercially available unit having a 100° coil movement in the range of zero to 50 microamperes. A photoelectric cell and galvanometer circuit per se has a positive temperature coefficient of resistance, i.e., its resistance increases with increase of temperature, with the result that for a given intensity of light falling on the photoelectric cell the galvanometer coil will be moved through an arc whose magnitude decreases with an increase in temperature. In FIG. 12, curve 120 indicates the rise in resistance of the photoelectric cell and galvanometer circuit per se occasioned by an increase in temperature from zero to 100° F.

In order to compensate for this positive temperature coefficient of resistance of the photoelectric cell and galvanometer circuit per se, thereby to achieve accurate setting of the iris throughout this range of temperature, we have included in the photoelectric cell and galvanometer circuit a compensating device comprising a resistor which has a negative temperature coefficient of resistance as designated at 97 in FIG. 11, such devices being commercially known as "Thermistors."

A thermistor, having a negative temperature coefficient of resistance which approximately inversely corresponds with the positive temperature coefficient of resistance of the photoelectric cell and galvanometer circuit per se, may be used. However, with a view toward minimizing bulk, a thermistor having a value of approximately 50,000 ohms at 0° F. decreasing to approximately 2,000 ohms at 100° F. is selected, the temperature resistance characteristic of this thermistor being shown by curve 121 (FIG. 12).

It will be apparent from a comparison of the resistance curves 120 and 121, that the negative temperature coefficient of resistance of the selected thermistor is greater than the positive temperature coefficient of the photoelectric cell and galvanometer circuit per se, and that accordingly, the selected thermistor cannot of itself properly compensate for the positive temperature coefficient of resistance of the photoelectric cell and galvanometer circuit per se. We have therefore, provided a modifying resistor 98 in shunt with the thermistor. Preferably, the resistor 98 is a carbon resistor, and has a zero temperature coefficient of resistance and approximately 4,000 ohms resistance as indicated by the line 122 (FIG. 12).

Observing that the temperature coefficient of resistance of the modifying resistor 98 lies between the positive temperature coefficient of resistance of the photoelectric cell and galvanometer circuit per se and the negative temperature coefficient of resistance of the thermistor 97, the combination of the parallel resistances 97 and 98 results in an overall negative temperature coefficient of resistance thereof which approximately inversely corresponds with the positive temperature coefficient of resistance of the photoelectric cell and galvanometer circuit per se, the overall resistance of the parallel resistors 97 and 98 being indicated by the line 123 (FIG. 12). Accordingly, the inclusion of the parallel resistances 97 and 98 in series with the photoelectric cell and galvanometer coil results in a compensation of the positive temperature coefficient of resistance of the photoelectric cell and galvanometer circuit per se, producing a resultant approximately zero temperature coefficient of resistance indicated by the line 124 (FIG. 12).

The photoelectric cell 21 requires an appreciable amount of resistance in the circuit connected across its terminals, and since the resultant resistance of the circuit comprising the galvanometer coil 27 and the parallel resistances 97 and 98 is in most cases too low, we have provided a trimming resistance 99 in series in the circuit, this resistance preferably being a carbon resistor having a zero temperature coefficient of resistance and its resistance being sufficient to increase the overall resistance of the circuit to that required by the photoelectric cell, as indicated by the line 125 (FIG. 12).

The value required of the resistance 99 varies rather widely in different assemblies because of differences in characteristics of individual components, and a typical value of the resistor 99 is 1,500 ohms. Through the above resistance arrangement the accuracy of the setting of the iris is maintained within acceptable limits of error throughout the entire range of temperature of zero to 100° F.

In the camera shown by way of example, the motor 70 is designed to operate on three and one-half (3½) volts and draws a maximum of 100 milliamperes when operating. The battery cells 84, shown in the drawings, are mercury cells capable of supplying 100 milliamperes of current for a total of twenty (20) hours with intermittent operation. Twenty (20) hours is estimated to be sufficient running time for the camera to expose 600 film magazines. It is therefore postulated that the shelf life of the battery cells 84 will be the controlling factor in the useful life of these cells, and that with average use of the camera this life will definitely be in excess of one (1) year and probably in the neighborhood of two (2) years.

With 100 milliamperes of current drawn as above, it is imperative that the motor be not blocked with its circuit closed. To this end, the stops 37 on the plate 30 (FIG. 6), by which the range of movement of the movable contact 29 of the galvanometer is controlled, are preferably set so as to limit the movement of the contact 29 to such position that the contact 46 engaged therewith will break the motor circuit just before the iris moves into a limits position. Thus, for example, if the lens 23 through which light is admitted to the photoelectric cell is covered, as with a hand, so that no light falls upon the cell, contact 29 will tend to move to its zero position, engaging the adjacent contact 46 to close the motor circuit, thereby to move the iris to fully open position. As the gear 44 revolves, the engaged contact 46 is moved in the same direction as the movable contact 29 is trying to move, and the motor circuit will remain closed until the contact 29 strikes the corresponding stop 37, thereby arresting further movement of this contact. Contact 46 will then move away from the contact 29, breaking the motor circuit, and stops 37 are preferably placed so that this will occur just before the iris is wide open.

Through the same arrangement, should the lens 23 of the photoelectric cell be pointed at an extremely bright light, the galvanometer coil 27 will move the movable contact 29 towards its other limits position, moving that contact against the other one of the contacts 46 to close the motor circuit, thereby to drive the iris ring 53 in the opposite direction to move the iris to fully closed position until the other stop 37 is engaged by the movable contact 29 to break the motor circuit just before the iris reaches this position.

With the photoelectric cell 21, galvanometer 25 as above specified, and the temperature compensation of the galvanometer circuit as above, the arrangement has been found to be sufficiently sensitive over a range of light value varying from a minimum of 1.5 candles per square foot to a maximum of 1600 candles per square foot, a range which compares favorably with the range of photographic light meters ordinarily used.

If it is desired to operate the iris manually, either in effort to take pictures beyond the range for which the automatic adjusting device is sensitive, or for other reasons, such manual operation can be achieved without interference from or disabling the automatic adjustment apparatus. When such manual operation is in progress, it is preferable that the switch 126 included in the conductor 103 (FIG. 11) be opened so that the motor circuit will not be closed even though the camera release button 91 be moved inwardly to engage the contact spring 92 with the contact 93. While it is possible to move the camera release button 91 to start and stop the camera without closing spring 92 against contact 93, it is preferable to definitely open the circuit of the motor.

The yieldable friction drive, comprising the gear 77 and friction disks 82 (FIG. 9) between the motor 70 and the exposure adjusting mechanism, permits rotation of the iris adjusting ring 53 and with it the contact carrying gear 44 independently of the motor, and to provide for manual rotation of the iris adjusting ring, a manual iris adjusting ring 127 (FIGS. 2 and 3), carried by the photographic lens assembly and fixed for rotation with the iris adjusting ring 55, provides for manual adjustment of the iris. The adjusting ring 127 is provided with an indexing scale 128 (FIG. 2) designating adjustments of the adjusting ring in terms of standard iris "F stop" numbers and an index mark 129 on the lens barrel 11 adjacent this adjusting ring cooperates with this indexing scale for manually predeterminately adjusting the iris.

Switch 126 has not been shown other than in FIG. 11, since its location on the camera is a matter of choice. Preferably the switch 126 is located in a not too accessible place so that its operation to open position will occur only when the switch is operated deliberately.

While we have chosen to show our invention by illustrating and describing a preferred embodiment of it, we have done so by way of example only, as there are many modifications and adaptations which can be made by one skilled in the art within the teachings of the invention.

Having thus complied with the statutes and shown and described a preferred embodiment of our invention, what we consider new and desire to have protected by Letters Patent is pointed out in the appended claims.

What we claim is:

1. In a photographic camera, the combination of adjustable exposure means for varying the exposure of the camera, a photoelectric cell, a galvanometer having a movable spring biased coil, a circuit connecting said cell and coil and comprising a resistor having a negative temperature coefficient of resistance for compensating for the positive temperature coefficient of resistance of the cell and coil circuit per se, and means under the control of said coil as deflected by light impinging on said cell for adjusting said exposure means in correspondence with the intensity of said light.

2. In a photographic camera, the combination of claim 1 and further comprising a trimming resistor included in said circuit in series with said first mentioned resistor for increasing that overall resistance of said circuit to that required by said cell.

3. In a photographic camera, the combination of adjustable exposure means for varying the exposure of the camera, a photoelectric cell, a galvanometer having a movable spring biased coil, a circuit connecting said cell and coil and comprising a resistor having a negative temperature coefficient of resistance in excess of the positive temperature coefficient of resistance of the cell and coil circuit per se and a modifying resistor connected in shunt with said first mentioned resistor and having a temperature coefficient of resistance lying between those of said first mentioned resistance and the cell and coil circuit per se, said resistors cooperating for compensating for the positive temperature coefficient of resistance of the cell and coil circuit per se, and means under the control of said coil as deflected by light impinging on said cell for adjusting said exposure means in correspondence with the intensity of said light.

4. In a photographic camera, the combination of claim 3 and further comprising a trimming resistor included in said circuit in series with said first and second mentioned resistors for increasing the overall resistance of said circuit to that required by said cell.

5. In a photographic camera, the combination of adjustable exposure means for varying the exposure of the camera, a photoelectric cell, a galvanometer having a movable spring biased coil, a circuit connecting said cell and coil and comprising a resistor having a negative temperature coefficient of resistance having values of approximately 50,000 and 2,000 ohms respectively at 0° F. and 100° F., a modifying resistor connected in shunt with said first mentioned resistors and having a zero temperature coefficient of resistance and a trimming resistor connected in series with said first and second mentioned resistors, said first and second mentioned resistors cooperating for compensating for the positive temperature coefficient of resistance of the cell and coil circuit per se and said trimming resistor being of a value increasing the overall resistance of said circuit to that required by said cell, and means under the control of said coil as deflected by light impinging on said cell for adjusting said exposure means in correspondence with the intensity of said light.

6. In a photographic camera including variable means for adjusting the exposure of the camera, the combination therewith of a photo-electric cell responsive to light from the field of view of the camera, adjusting means for adjusting the variable means, a galvanometer for actuating the adjusting means and having a coil energized by the photo-electric cell and having a positive temperature coefficient of resistance, first and second resistors connected in series with the coil and the cell, and a third resistor having a negative temperature coefficient of resistance connected in shunt with one of the first and second resistors and in series with the other of the first and second resistors and the coil and cell, the relative temperature coefficients of resistance and resistances of the resistors being such as to compensate for change in temperature of the coil and cell with change in temperature.

7. In a photographic camera including variable means for adjusting the exposure of the camera, the combination therewith of a photo-electric cell whose current output decreases with increase in temperature and responsive to light from the field of view of the camera, adjusting means for adjusting the variable means, galvanometer means for actuating the adjusting means and having a coil energized by the photo-electric cell and having a positive temperature coefficient of resistance, and a network connected in series with the cell and the coil for compensating for variations in temperature of the cell and coil and including in shunt relationship relative to one another a first resistor having substantially a zero temperature coefficient of resistance and a second resistor having a negative temperature coefficient of resistance.

8. In a photographic light responsive device including a galvanometer and photovoltaic cell means constituting the sole source of electric current to the galvanometer, the combination therewith of a first resistor having a substantial temperature coefficient connected in circuit with the galvanometer and cell means to control the current supplied to the galvanometer, and a second resistor having a substantially zero temperature coefficient connected in parallel with the first resistor, the first and second resistors serving to cause the current to the galvanometer to be substantially constant for a given illumination of the cell means regardless of the temperature.

9. The photographic light responsive device of claim 8 wherein the first resistor has a negative coefficient of temperature, and means connecting the first resistor and the second resistor in series with the cell means and the galvanometer.

10. In a camera automatic exposure control including a galvanometer having a galvanometer provided with a driving coil and a power source including a photoelectric cell for supplying current to the coil in accordance with illumination of the cell, the power source constituting the sole source of power to the galvanometer, means connecting the galvanometer and the power source so that all current to the galvanometer passes through the cell, the combination therewith of a first resistor having a substantial temperature coefficient, a second resistor having a negligible temperature coefficient, and circuit means connecting the first and second resistors in parallel with one another and in circuit with the coil and the cell to maintain the flow of current from the cell to the coil constant for a given illumination of the cell regardless of temperature.

11. The camera automatic exposure control of claim 10 wherein the photoelectric cell is of the photovoltaic type and constitutes the sole source of current to the coil, the first resistor has a substantial negative coefficient of temperature, and the circuit means connects the first and second resistors in series with the cell and the coil.

12. In a photographic light responsive device including a galvanometer and a power source including a photoelectric cell through which cell all current to the galvanometer flows, the combination therewith of a first resistor having a substantial temperature coefficient, a second resistor having a substantially zero temperature coefficient, and means connecting the resistors in parallel with one another and to the cell and the galvanometer in such a manner as to cause the current to the galvanometer to be substantially constant for a given illumination of the cell regardless of the temperature.

References Cited in the file of this patent

UNITED STATES PATENTS

| | | |
|---|---|---|
| 2,388,609 | Ericsson | Nov. 6, 1945 |
| 2,626,361 | Martine | Jan. 20, 1953 |
| 2,655,086 | Walker | Oct. 13, 1953 |
| 2,739,506 | Stimson | Mar. 27, 1956 |

OTHER REFERENCES

Bell Laboratories Record, Dec. 1940, pages 106 to 111.
Electronics-magazine, page 202, vol. 29, No. 7, July 1956.